United States Patent [19]

Haglund

[11] Patent Number: 5,105,725
[45] Date of Patent: Apr. 21, 1992

[54] BARBECUE GRILL AND COOKING GRID ELEMENT

[76] Inventor: Allen C. Haglund, 7726 Teakwood Place, Vancouver, BC, Canada, V5S 4A5

[21] Appl. No.: 480,622

[22] Filed: Feb. 14, 1990

[30] Foreign Application Priority Data

Feb. 15, 1989 [CA] Canada ............................ 591067

[51] Int. Cl.⁵ ............................................. A47J 37/07
[52] U.S. Cl. ............................... 99/446; 99/449; 99/450; 126/25 R
[58] Field of Search ............... 99/445, 446, 444, 450, 99/449, 425, 400, 375; 126/25 R, 41 R, 214 C

[56] References Cited

U.S. PATENT DOCUMENTS

| | | | |
|---|---|---|---|
| 2,117,749 | 5/1938 | Studer | 99/446 |
| 3,285,239 | 11/1966 | Drake | 99/446 |
| 3,308,747 | 3/1967 | Spagnolo | 99/445 |
| 3,369,481 | 2/1968 | Pappas | 99/445 |
| 3,623,422 | 11/1971 | Marshall | 99/400 |
| 3,842,726 | 10/1974 | Fautz | 99/425 |
| 4,403,541 | 9/1983 | Berger | 99/450 |
| 4,773,319 | 9/1988 | Holland | 99/446 |
| 4,784,109 | 11/1988 | Korpan | 126/25 R |
| 4,878,477 | 11/1989 | McLane | 99/444 |
| 4,930,491 | 6/1990 | Purello | 126/25 R |

FOREIGN PATENT DOCUMENTS

| | | | |
|---|---|---|---|
| 0221348 | 5/1959 | Australia | 99/425 |
| 2080097 | 2/1982 | United Kingdom | 99/444 |

*Primary Examiner*—William A. Cuchlinski, Jr.
*Assistant Examiner*—John L. Beres
*Attorney, Agent, or Firm*—Cassidy, Vance & Tarleton

[57] ABSTRACT

A barbecue grill and cooking grid element including a shell-like housing having a bottom wall and an upstanding peripheral sidewall; a cover hingedly connected to the shell-like housing; a heat source mounted in the shell-like housing; and, a grid element mounted in the shell-like housing above the heat source. The grid element comprises at least one generally planar base element and a plurality of integral, upstanding, spaced apart, parallel elongated ribs integral with the base element, there being at least one opening and, preferably a plurality of openings, formed in the base element between each adjacent pair of upstanding ribs. The heat source may comprise any conventional heat source such, for example, as an electrical heating element or a gas-fired heating unit.

2 Claims, 5 Drawing Sheets

BARBECUE GRILL AND COOKING GRID ELEMENT

BACKGROUND OF THE INVENTION

1. Technical Field

The present invention relates generally to barbecue-type cooking apparatus and the like; and, more particularly, to an improved recyclable grid element formed of aluminum—preferably extruded, and preferably having a non-stick coating applied thereto—which grid element can be used in both domestic and institutional cooking equipment, including, but not limited to, barbecues which may be heated by means of a gas burner such as a propane burner, charcoal briquettes, electrical heating elements, and the like. More specifically, the grid element of the present invention is characterized by its efficiency and economy enabling effective heat transfer using minimal fuel sources while insuring that the heat levels to which the grid element is subjected can be maintained below 800° F., thereby permitting the use of commercially available non-stick coatings which tend to be destroyed at temperature levels in excess of 800° F. The grid element of the present invention eliminates the need to employ lava rock and similar briquettes and their requisite support grate.

2. Background Art

The trend towards the usage of barbecues, both indoor and outdoor barbecues by both domestic and industrial consumers, has been rapidly growing in recent years. Such barbecues have been heated in a variety of ways. Initially, most of the barbecues employed charcoal briquettes; but, the usage of such briquettes is messy and time consuming, requiring constant replenishment of the fuel source; and, the resultant heating quality is unreliable. Consequently, propane and similar gas-fired cooking equipment, as well as electrically heated cooking equipment, which simulate charcoal fired barbecues have become very popular in the past decade or so. It has been found that the heat capacity of such units can be controlled, and the equipment heats up quickly; although, many of such units require the use of lava rock and/or similar simulated charcoal briquettes.

Such conventional cooking apparatus commonly employs a rectangular, hollow, shell-like tub, trough or housing within which a suitable heat source—e.g., a gas-fired burner element or an electric burner element—is mounted. The typical conventional barbecue unit will commonly employ a lid which is complemental to the shell-like housing and is shaped somewhat like an inverted tub, such lid being hingedly coupled to the shell-like housing within which the burner element is mounted. A porous metal grate, which usually extends across the length and width of the lower shell-like housing, is commonly mounted above the burner element in the base of the lower shell, generally about one-half (½) to two-thirds (⅔) the way from the bottom of the lower shell, such grate serving to support a layer of lava rock, pebbles, stones, or briquettes. Mounted above the layer of lava rock or the like and adjacent the top surface of the lower shell is a grid-like element which is usually constructed of a number of wires arranged in a grid-like pattern. Alternatively, some such grid elements comprise a rectangular frame including a plurality of laterally spaced, parallel, rounded, porcelainized supports spaced by longitudinally extending slots. The meat or other food (such as vegetables) to be cooked is placed on the grid element and is cooked by a combination of radiant and convection heat generated by the underlying layer of lava rock which is, in turn, heated from below by heat generated by burning propane or other gas, or by a suitable electric heater located in the belly of the lower shell.

The problems with these conventional arrangements are that the units are generally quite heavy and not very portable because the lava rocks or other briquettes tend to shift when the unit is tipped and are susceptible to flaming when hot fat from the meat on the grid element drips onto the hot lava rock or similar briquettes and ignites. Such flames usually unappetizingly char the meat if allowed to proceed. Consequently, the operator is usually required to constantly monitor the food while it is cooking and to extinguish such flames with a water spray from a spray bottle.

A number of issued patents disclose various designs of gas-fired cooking equipment and barbecues that are more or less relevant to this general area of technology.

For example, U.S. Pat. No. 4,566,429—Williams discloses a cooking grid for a barbecue grill which has a grid portion for cooking steaks and a griddle portion for cooking hamburger patties and other small food products. The cooking grid is a cast metal member with the grid and griddle portions integrally formed therein. The grid portion has large rectangular openings and is highly porous. The griddle portion consists of a section of support metal containing a plurality of smaller apertures, preferably circular, and having a lower porosity. The Williams cooking grid is not designed to replace lava rock, charcoal briquettes or the like and their requisite support grates.

The inventor of the present invention has previously been granted U.S. Pat. No. 4,587,948. This patent discloses a portable cooking apparatus comprising a housing having two cooking sections hinged together along a respective sidewall whereby the sections may be disposed side-by-side with their open ends facing upwardly and displaceable to be juxtaposed with their open ends facing one another. Each section has a bottom wall, opposed sidewalls, and opposed end walls. One of the cooking sections has a heat generating element secured therein beneath a heat transmitting support frame. The other concave section has a gas burner assembly supportable on the bottom wall thereof below a further heat transmitting support frame. The assembly has an open top end pan with a gas burner element disposed substantially centrally therein. A flame shield is disposed over the burner. A secondary heat deflection support plate maintains the pan spaced from the bottom wall, sidewall and end walls. The pan is also ventilated by vent openings provided in the side and end walls of the cooking section. This cooking device does not include a single grid which replaces the lava rock, charcoal briquettes and the like and their requisite support grate.

SUMMARY OF THE INVENTION

A grid element for use in association with barbecue-type cooking apparatus—i.e., including merely by way of example and not by way of limitation, both domestic and industrial charcoal fired, gas fired and electrically fired indoor and outdoor cooking apparatus irrespective of whether such apparatus is portable or is permanently or semi-permanently installed; and, it is in that broad sense that the phrase "barbecue-type cooking apparatus" is used herein and in the appended claims—comprising: i) a planar base element constructed of aluminum or similar heat conducting metal or substance; ii) a plurality of upstanding, spaced, elongated, parallel ribs extending vertically from the planar base element; and iii), at least one opening formed in the planar base element between each pair of adjacent elongated ribs. The exemplary grid element of the present invention includes five (5) elongated ribs, although those skilled in the art will appreciate that more or fewer ribs can be employed. A plurality of openings are formed in the base element between the adjacent pairs of ribs. In the exemplary device, the openings are oblong in shape and have their longitudinal dimension parallel with the direction of the longitudinal ribs. However, the openings may be circular, rectangular, or of any other desired configuration.

The grid element of the present invention is preferably modular. Thus, the exemplary grid element is rectangular in shape having a longitudinally extending tongue formed in one edge of the grid element, and a corresponding longitudinally extending groove formed in its opposite lateral edge, thereby permitting a plurality of such grid elements to be assembled in side-by-side tongue-in-groove coupled relationship. Those skilled in the art will, however, appreciate that the grid element can have other configurations—e.g., it can be circular oval, or shaped such that when a plurality of such grid elements are assembled in side-by-side relation, the overall cooking surface defined thereby is oval, circular, or of any other desired shape.

When the invention is employed in connection with a gas/air burner, the burner preferably comprises one or more elongated tubes having a gas inlet opening at least one end thereof. A plurality of peripherally disposed radial air inlet openings are provided at the end of the tube adjacent the gas inlet opening. A plurality of gas/air ejection ports are formed in the tube and extend laterally therefrom with such ports sized to insure ejection of substantially uniformly sized gas/air streams. A pair of longitudinally spaced angular bends or turns are formed in the tube intermediate the air inlet openings and the closest gas/air ejection port so as to insure redirection of the gas/air stream and consequent homogeneous mixture thereof. When one or more independent tubes are employed, the end(s) of the tube(s) remote from the gas inlet port is(are) closed. Such independent tube(s) is(are) disposed in a horizontal plane and may lie along one or more linear paths or, alternatively, may be disposed along portions of a circular or oval path.

On the other hand, when a single tube is employed, both ends thereof may be coupled to a suitable gas source, in which event radial air inlet openings are formed about the periphery of both ends of the tube adjacent the gas inlet opening and the tube can be configured in a circular, oval and/or U-shaped configuration adapted to lie in a horizontal plane with the midpoint of the tube including, if desired, either a gas restriction in the form of a crimp or the like or a plug or other means limiting, or even precluding, communication between the opposite ends of the tube.

The invention is also directed to a barbecue-type cooking apparatus as hereinabove defined comprising:

a) an open topped hollow cabinet-like shell;

b) a grid element comprising a planar base element constructed of heat conducting metal or substance, at least two elongated, spaced apart, parallel, vertical ribs integral with the planar base element, and at least one opening formed in the base element between the elongated ribs with the base element being supported by the cabinet or shell and extending across the top area thereof; and, c) a suitable heat source which may comprise a bed of heated charcoal briquettes, a bed of lava rocks, or the like disposed above a suitable gas burner or electric heating unit.

In the exemplary cooking apparatus, a removable tray may be mounted in the interior of the cabinet below the burner. Moreover, a plurality of grid elements may be arranged across the top area of the cabinet in side-by-side relation.

DESCRIPTION OF THE DRAWINGS

These and other objectives and advantages of the present invention will become more readily apparent upon reading the following Detailed Description and upon reference to the attached drawings, in which:

FIG. 5 is an isometric view of the burner element shown in FIG. 4;

FIG. 6 is an isometric view of a suitable T-shaped fitting that can be used to couple the exemplary burner element of FIGS. 4 and 5 to a suitable source of propane gas or the like;

While the invention is susceptible of various modifications and alternative forms, specific embodiments thereof have been shown by way of example in the drawings and will herein be described in detail. It should be understood, however, that it is not intended to limit the invention to the particular forms disclosed; but, on the contrary, the intention is to cover all modifications, equivalents and/or alternatives falling within the spirit and scope of the invention as expressed in the appended claims.

DETAILED DESCRIPTION

Figure 1:
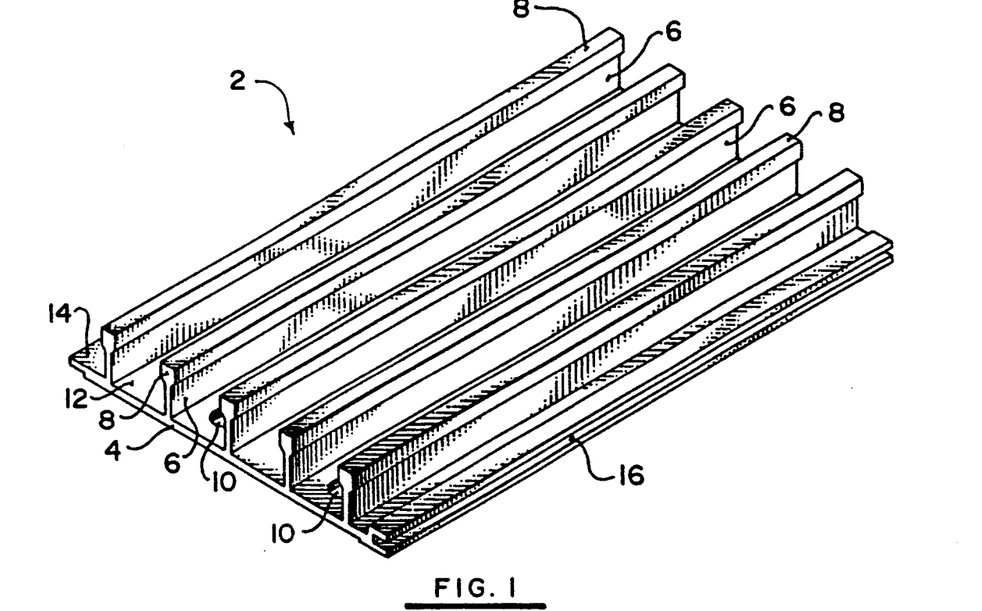
FIG. 1 is an isometric view here depicting one embodiment of a grid element embodying features of the present invention.

Turning now to the drawings, and directing attention initially to FIG. 1, an exemplary grid element, generally indicated at 2, embodying features of the present invention has been shown. Preferably the exemplary grid element 2 is formed of extruded aluminum, thereby rendering the device recyclable. In practice the grid element would be formed of aluminum extrusions on the order of twenty (20) feet or more in length, which lengths are then cut into sizes as required to fit across the top of the cooking surface of conventional barbecue-type cooking apparatus, both indoor and outdoor, for both domestic and industrial use, including grills for restaurants and hotels, and grills for indoor natural gas kitchen stoves. The exemplary grid 2 is constructed so that it has a generally planar base 4 which here supports five (5) longitudinally extending, parallel, spaced, vertical ribs 6, each uniformly spaced along the planar base 4 and extending the full longitudinal length thereof. Those skilled in the art will appreciate that more or less ribs 6 may be formed on the base 4 to suit specific requirements. The vertical ribs 6 are relatively thin; and, each defines at the top thereof a grill rail 8 which is thicker than the body of the vertical rib 6. The top surfaces of the grill rails 8 provide a cooking surface for meat or other food products that are placed thereon.

In keeping with the present invention, the upper surface of the grid element 2—i.e., the upper exposed surface of the generally planar base 4 and all exposed surfaces of the upstanding vertical ribs 6 and the grill rails 8—are preferably coated with any suitable and commercially available non-stick coating. For example, a Teflon (a registered trademark of DuPont) coating can be applied to the grid element 2 in any conventional manner. Alternatively, the non-stick coating may comprise XYLAN (a trademark of Whitford Corp. of Frazer, Pa.) and more particularly, the 8200 Series XYLAN non-stick coating which is applied in two coats—viz., a primer coat identified as Product No. 8251/865 and a second coat identified as Product No. 8253/080. However, whether the non-stick coating is applied as a single coating, or as two or more coatings, the net result is to reduce the tendency of the meat and other food products to stick to the upper surfaces of the grill rails 8. And, where the grid element 2 is formed of aluminum, the thus coated grid element remains recyclable.

In keeping with this aspect of the present invention, it will be observed that the spaced parallel ribs 6 form between them a series of trough-like bases 12. Spaced uniformly along each of the trough-like bases 12 are a series of vent holes 10 which serve several important purposes. Thus, the vent holes 10 permit hot gases generated by the heat source (not shown in FIG. 1) disposed beneath the grid element 2 to pass upwardly through the grid element 2. Moreover, the vent holes 10 permit a certain amount of drippings from the food product being cooked thereon to pass through the holes. Additionally, the presence of the vent openings in the grid element 2 insures that when the element is subjected to expansion and contraction attendant heating and cooling thereof, the material remains in a generally planar unwarped state.

In order to permit the grid elements 2 to comprise modular grid elements which can be used in multiple side-by-side arrangements limited only by the width of the barbecue-type unit on which they are mounted, one longitudinal edge of the planar base 4 is provided with a longitudinally extending tongue 14 parallel to the longitudinally extending ribs 6. The opposite longitudinal edge of the planar base 4 is provided with a complementally shaped longitudinal groove 16. Thus, the arrangement is such that the tongue 14 of one grid element 2 can be inserted into the groove 16 in an adjacent grid element 2 so as to permit multiple grid elements each having a longitudinal length substantially equal to the front-to-rear depth of the housing on which they are mounted to be assembled together so as to entirely span the housing from left-to-right.

Figure 2:
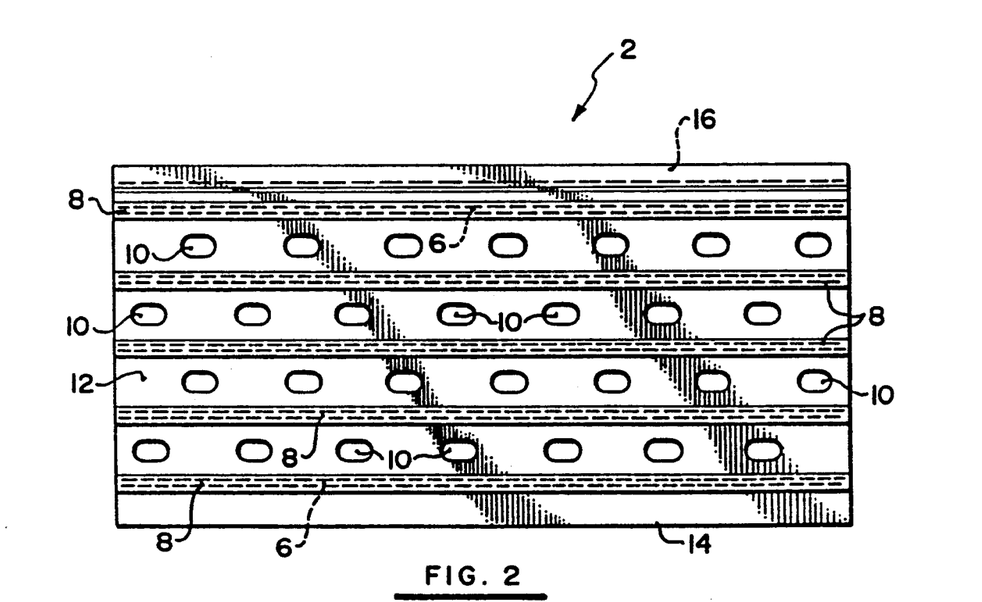
FIG. 2 is a top plan view of the grid element shown in FIG. 1.

Referring to FIG. 2, it will be noted that the grill rails 8 extend along the length of the grid element 2 parallel to one another. The space between the respective adjacent grill rails 8 should be sufficiently narrow so that sausages, weiners and the like do not fall between the grill rails 8; but, at the same time, the grill rails 8 should not be so close together that passage of hot combustion gases through vent holes 10 is deterred.

The spatial arrangement of the vent holes 10 is well illustrated in FIG. 2. Thus, the arrangement is such that the vent holes 10 in adjoining rows or trough-like bases 12 are staggered to enhance convection of hot combustion cooking gases through the entire area of the grid element 2 and to permit a more uniform overall expansion and contraction of the generally planar base 4. As previously indicated, the grid element 2 is preferably constructed of aluminum which has a high heat transfer capacity compared to other common industrial metals such as steel, cast iron, and the like. Consequently, heat for cooking meat and other food items on the grill rails 8 is conducted evenly over the entire surface of the grid element 2, thereby insuring evenly distributed cooking action over the entire grid surface. In the exemplary device depicted in FIG. 2, the vent holes 10 are generally oblong ovate openings which have been found to be preferable to circular holes or other configurations. Such oblong vent holes 10 appear to relate well with the dimensions of the trough-like bases 12 between the vertical ribs 6 and promote convection of hot gases through the grid 2. However, those persons skilled in the art will appreciate that circular, square, rectangular and other shaped openings can be provided if desired.

It has been determined by experimentation that the overall area of the vent holes 10 should preferably be in the range of from about ten percent (10%) to about twenty-five percent (25%) of the total area of the planar base 4 in order to maximize performance of the grid element 2. This range has proven to provide a good balance between openings through which the hot combustion gases can pass upwardly and a base which can collect a certain amount of hot dripping fat from meat which has been cooked on the grid element 2. If the base 4 collects too much fat, then the fat can ignite which chars the meat resting on the grill rails 8. Also, if an excessive area is provided by the vent holes 10, then it is possible for flames originating from below the base 4 to pass upwardly through the vent holes 10 and char the meat being cooked on the grill rails 8. A minimum area of solid base 4 is also desirable in order to collect fat and other juices dripping from the meat and other food products being cooked on the grid element 2. The hot base 4 cooks the dripping fat and juices, and generates a certain amount of smoke and flavored gases which provide a "barbecue-type" flavor to the meat and other food products.

It has further been found from experimentation that the height of the vertical ribs 6, their lateral spacing, and the sizes of the vent holes 10 are important variables that can affect the overall operation and efficiency of the grid element 2. Thus, if the ribs 6 extend too high above the base 4, the metal content of the grid element 2 becomes excessive, and the overall cost of the grid element 2 rises to uneconomical limits. Also, passage of hot combustion gases through the vent holes 10 is inhibited when the ribs 6 are too high. On the other hand, if the ribs 6 are too low, the meat or other food tends to smother the flow of combustion gases through the vent holes 10, and hinders cooking action. Likewise, the "barbecue-like" effect created by the dripping fat and juices dropping on the planar base 4 between the vertical ribs 6 seems to be hindered somewhat.

It has been found that a grid element 2 which has vertical ribs approximately three-quarters (¾) of an inch in height and spaced apart by about one (1) inch provides an efficiently operating grid element 2 for the average barbecue. The vent holes 10 are typically one-half (½) inch in length, five-sixteenths (5/16) of an inch in width, and are spaced about one (1) inch apart. A typical rectangular grid unit measures five and one-quarter (5 ¼) inches in width and ten and three-quarter (10 ¾) inches in length; although it will be understood by those skilled in the art that the length can be selected such that the grid element 2 can be mounted at the top of virtually any barbecue housing spanning the housing from front-to-rear. In the exemplary grid element 2, the thickness of the vertical ribs 6 is approximately three thirty-seconds (3/32) of an inch, while the widths of the grill rails 8 is typically three-sixteenths (3/16) of an inch. The grill rails 8 have an advantage in that they leave an attractive series of dark brown, parallel lines on the barbecued meat as occurs with conventional barbecue systems.

Figure 3:
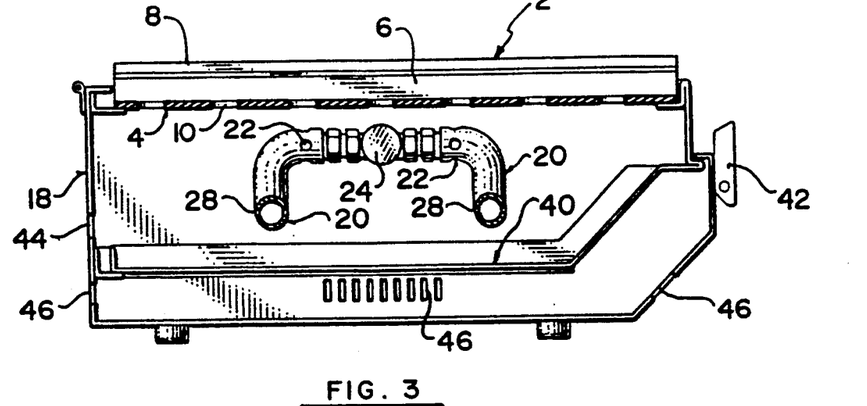
FIG. 3 is a vertical sectional view showing an exemplary cooking apparatus made in accordance with the present invention, here depicting the grid element of FIGS. 1 and 2 mounted along the upper open end of the cooking apparatus housing.

In carrying out the present invention, and as best illustrated in FIG. 3, one or more grid elements 2 is or are preferably mounted in the upper open end of a hollow shell-like cabinet or housing 18 with the parallel longitudinally extending ribs 6 extending from front-to-rear—i.e., from right-to-left as viewed in FIG. 3. In the exemplary device, a gas burner 20 is mounted within the housing 18 beneath the grid element 2. As can be seen upon inspection of the drawing, no lava rock or lava rock support grate is required between the burner 20 and the grid element 2. A removable drip tray 40 may optionally be included and mounted within the housing 18 below burner 20. When employed, drip tray 40 serves to collect dripping fat and juices which drop through the vent holes 10 in the grid elements 2; and, since the tray 40 is readily removable, it may be easily cleaned. The drip tray 40 minimizes the necessity of having to clean the interior of the housing 18.

Figure 4:
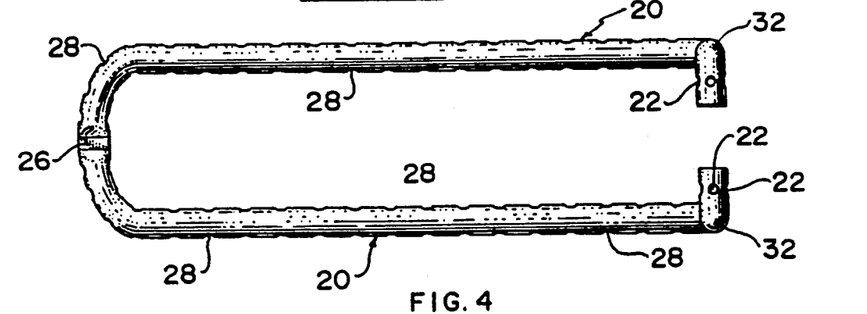
FIG. 4 is a top plan view of an exemplary burner element made in accordance with another aspect of the present invention.
Figures 5, 6:
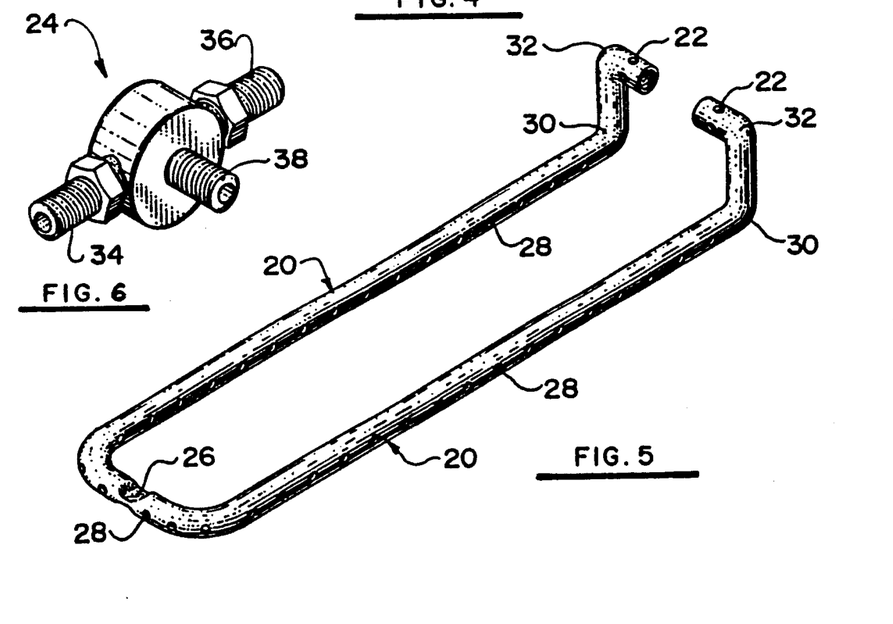

In carrying out the present invention when employing a gas-fired burner such as the burner 20 depicted in FIG. 3, the burner unit is preferably formed of one-half (½) inch steel or brass tubing. As best shown in FIGS. 4 and 5, the exemplary burner 20 is formed in the shape of an elongated "U" having a plurality of laterally directed gas/air ejection ports 28 formed in both the interior and the exterior sides of the U-shaped tubing. The gas/air ejection ports 28 serve to generate flame jets from both the interior and exterior of the burner 20 along both sides thereof. The diameters of the gas/air ejection ports 28 can be varied to provide jets of substantially even length throughout the length of the tubing 20. In keeping with this aspect of the invention, a plurality—here four (4)—of radial air holes 22 are formed adjacent the free open ends of the burner tube 20 so as to permit air to be inducted into the tube 20 to mix with the propane or other gas that is passed into the burner tube 20.

A suitable T-fitting--here, a T-fitting 24—is provided to couple the two (2) free ends of the burner tube 20 with a source of propane or natural gas (not shown). A conventional gas regulator (not shown) is adapted to be connected to the T-fitting 24 with the gas regulator being directly connected to the source of gas.

It has been found that in order to provide proper combustion action for the gas/air mixture that is ejected through the series of gas/air ejection ports 28, it is important that the air that is brought into the burner tube 20 through the air holes 22 be properly mixed with the gas. To accomplish this, a pair of longitudinally spaced angular bends 30, 32 are provided in the regions of the burner tube 20 intermediate the sets of air holes 22 and the closest gas/air ejection ports 28. Absent these angular bends 30, 32 in the burner tube 20, it has been found that the burner tends to extinguish itself, perhaps due to an accumulation of carbon monoxide or carbon dioxide within the interior of the tube 20, or because of improper gas/air mixing action. The size of the air holes 22 must also be gauged so that a proper blend of gas and air is formed, thereby insuring efficient combustion action of the propane or other gas. Although not shown in the drawings, those skilled in the art will appreciate that such gauging of air holes 20 may be accomplished by a suitable shutter mechanism mounted about the periphery of the open ends of the tube 20 in a manner conventional in the art. If the air holes 22 are too large, then the gas/air mixture is too "lean" and operation of the burner 20 is unreliable and does not generate sufficient heat. On the other hand, if the air holes 22 are too small, then the gas/air mixture is too "rich" and there is a tendency for carbon buildup and inefficient burning of the propane or other gas.

It has been found in the practice of the present invention that a series or set of four (4) air holes 22 around the circumference of the burner tube 20 on each side of the T-fitting 24 operates efficiently. For half (½) inch steel tubing, it has been found that the air holes 22 should be about seven thirty-seconds (7/32) of an inch in diameter unless some provision such as an adjustable shutter is made for varying the size of the openings. The smooth generally right angle bends 30 and 32 in the exemplary burner tube 20 appear to create sufficient turbulence in the flowing gas/air mixture to quickly and fully mix the gas and air before the gas/air ejection ports 28 are reached. It has been found that in operating the burner tube 20 employing the design described above, the carbon monoxide output is only about twenty (20) parts per million which is five (5) times lower than the maximum allowable for indoor cooking appliances. This is also lower than any commercially available burner. Accordingly, the burner tube 20 has proven extremely efficient.

In the exemplary apparatus, a crimp 26 provided at the midpoint of the burner tube 20 creates a slight obstruction for passage of the gas/air mixture from one side of the burner tube 20 to the other. That is, the crimp 26 creates a slight back pressure, which insures that both sides of the burner tube 20 operate uniformly. It has been found that if the gas/air ejection ports 28 are of even size throughout, the length of the flame jets is longest at each end of the two parallel tubes 20 and gradually decreases in length until the center of each side of the tube is reached. Evidently the crimp 26 provides some back-pressure which causes the length of the flame jet to be longest on each side of the crimp 26.

Those skilled in the art will, of course, appreciate that a "U" shaped tube 20 is not necessary in all instances. Thus, the burner tube 20 could take a circular configuration, it could be oval in configuration, or any other suitable design could be devised using the basic principles of the burner design as described above. Indeed, it has been found that excellent results can be achieved using simply a straight or linear burner tube closed at one end and open at its opposite end for coupling to a source of gas under pressure provided only that a pair of substantially right angular bends are formed in the tube intermediate the air inlet openings 22 and the closest gas/air ejection ports 28.

Referring to FIG. 6, an exemplary gas T-fitting 24 has been shown. Thus, it will be noted that the fitting includes first and second gas stems 34 and 36 which are sized to fit respectively into each open end of the burner tube 20. Gas ports are formed in the ends of the two (2) stems 34, 36. A main gas stem 38 extends from the mid region of the fitting 24 and is adapted to be connected to a conventional propane or natural gas fitting including a gas regulator (not shown).

Figure 7:
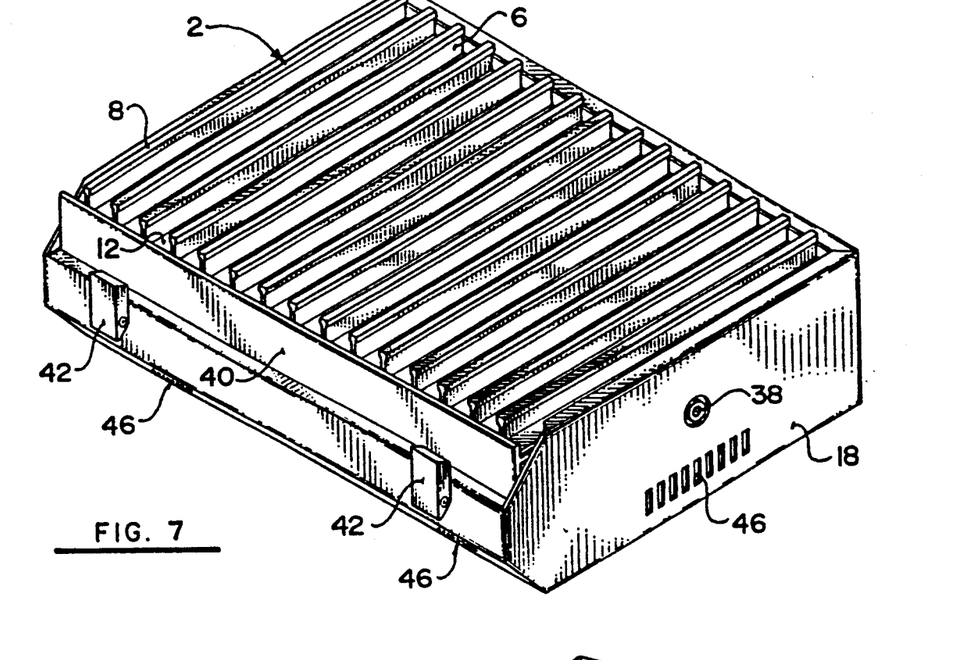
FIG. 7 is an isometric view of the exemplary cooking apparatus depicted in FIG. 3, here illustrating the cooking apparatus with three (3) identical grid elements interconnected in side-by-side relation and mounted on the top of the housing for the cooking apparatus.

Referring next to FIG. 7, the cooking apparatus heretofore described in connection with FIG. 3 has been more clearly shown. Thus, it will be noted that the housing 18 includes a plurality of interconnected grid elements 2 which are supported in side-by-side relation and extend laterally across the top surface of the housing 18. As previously described, the adjacent grid elements 2 are interconnected by means of the respective tongue 14 and groove 16 combinations formed therein. Moreover, it has been found that such tongue and groove combinations assist in conduction of heat from one grid element to another. It has also been found that heat is distributed more evenly over the entire grid surface than is the case with conventional propane fired barbecues which utilize a grid/lava rock/grate combination. The housing 18 has formed in its rear wall a series of burner vents 44, while a series of lower air vents 46 are formed in the front, rear and side walls beneath the level of the drip pan 40. Housing 18 is also provided with a pair of lid locks 42 on its front wall.

The interlocking tongue/groove construction of the grid elements 2, in addition to being useful for enabling heat to be conducted from one grid element to another, is also useful in assuring that the adjacent grid elements link together so that they do not come apart when the barbecue unit is tipped on end, as is the case in portable barbecue units that are packed for carrying. This is a distinct advantage compared to portable barbecue units which utilize the conventional grill, lava rock and lava rock supporting grate combination. When such conventional units are tipped on end, the lava rock slumps to one side and must be rearranged when the portable unit is placed in a horizontal position for cooking.

Figure 8:
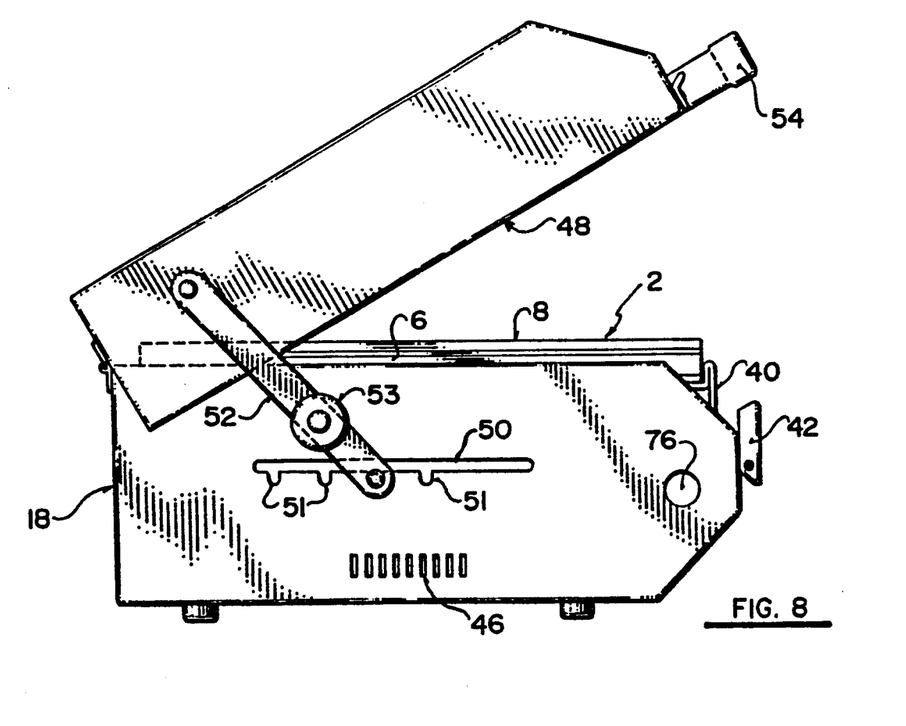
FIG. 8 is a side elevational view of the cooking apparatus depicted in FIGS. 3 and 7, but here illustrating such apparatus with a closable lid hingedly connected thereto.

Referring next to FIG. 8, a side elevational view of the housing 18 has been depicted. It will be noted that the air vents 46 are visible on the side of the housing 18. A pivotal lid 48 can be raised or lowered onto the top surface of the housing 18 and the grid element 2. The position of the lid 48 can be adjusted to various angular open positions by moving lift arm 52 along lift arm slot 50 formed in the sidewall of the housing. A series of slot stops 51 provide intermediate adjustability. The lift arm 52 can be moved by means of a knob 53. The handle 54 permits the lid 48 to be either lifted or lowered. A port 76 is formed in the sidewall which can be used to permit ignition of the propane or other gas which is being ejected from the burner tube 20 by means of a match or other suitable igniter. Alternatively, a suitable spark igniter (not shown) can be mounted in the port 76.

Figure 9:
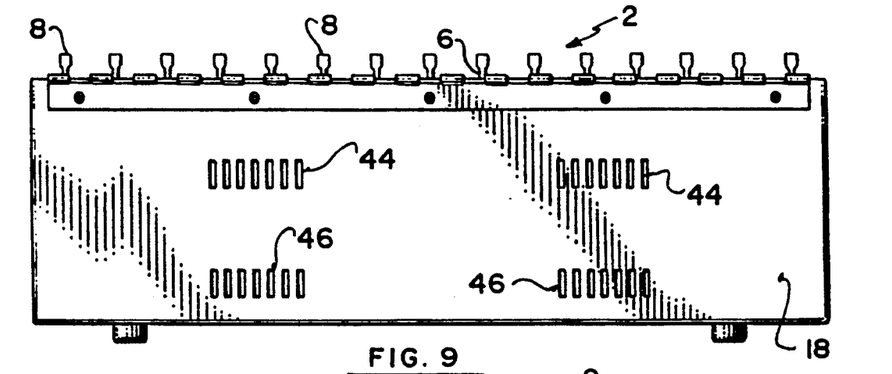
FIG. 9 is a rear elevational view of the cooking apparatus shown in FIGS. 3, 7 and 8.
Figure 10:
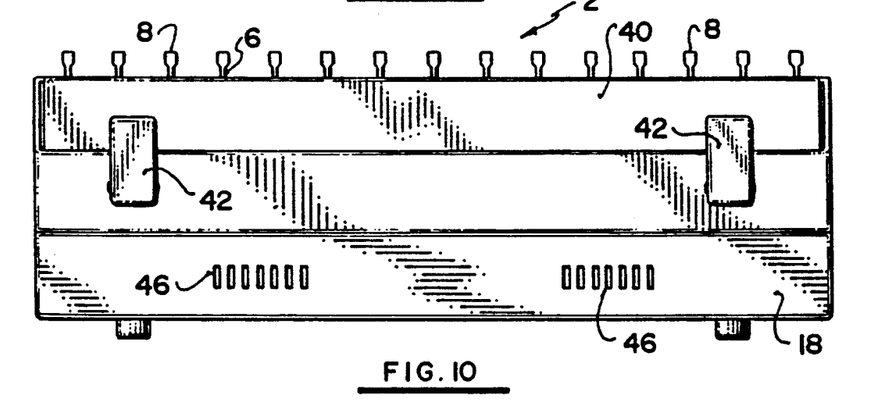
FIG. 10 is a front elevational view of the cooking apparatus depicted in FIGS. 3, 7 and 8.

As more clearly shown in FIG. 9 comprising a rear view of the housing 18, burner vents 44 are formed in the upper portion of the rear wall of the housing 18, while lower air vents 46 are formed in the lower portion of the rear wall of housing 18. Burner vents 44 permit ambient air to pass from the exterior of the cabinet into the volume of space above the removable drip tray 40 housing the burner tube 20 with such ambient air serving to promote adequate combustion.

On the other hand, the lower air vents 46 formed in the front, rear and side walls of the housing 18, as best shown by reference to FIGS. 7 through 10 conjointly, serve to permit ambient air to pass freely underneath the drip tray 40 which, in turn, prevents heat generated by the burner tube 20 from passing downwardly. Such ambient air passing through the lower air vents 46 assists in cooling the lower portion of the housing 18. The result is that the bottom of the housing 18 remains relatively cool; and, thus can be placed on any suitable surface such as the top of a picnic table or counter. Rubber feet are formed in the bottom surface of the housing 18 to elevate the housing slightly above the counter surface; and, at the same time, the feet serve to provide a gripping action so that the housing 18 does not slide over the counter surface or table top when meat or other food being cooked on the grid element 2 is moved about.

Figure 11:
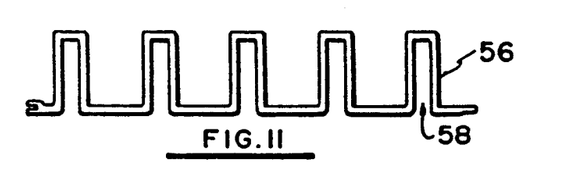
FIG. 11 is an end view of a slightly modified construction for a grid element embodying features of the present invention.

Referring next to FIG. 11, an alternative grid design 56 has been illustrated. As here shown, grid 56 is formed of sheet metal which can be shaped by means of any suitable press rolls and dies. The ribs can be formed so that they are closed from the bottom or can be formed so that there is a series of convection channels 58 formed in the underside of the grid 56. Convection channels 58 permit hot cooking gases to circulate up to the top surface of the grid 56.

Figure 12:
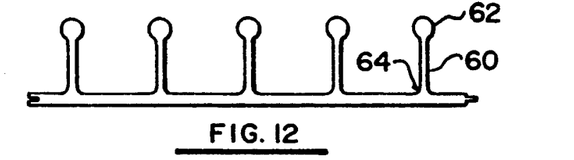
FIG. 12 is an end view similar to FIG. 11 and illustrating yet another alternative type of grid element embodying features of the present invention.

A somewhat alternative form of grid has been illustrated at 60 in FIG. 12 here employing rounded edges at all locations rather than the right angled edges depicted in FIG. 1. Thus, grid 60 has a series of bulbs 62 formed at the top of each rib 60. These bulbs replace the rails 8 depicted in FIG. 1. Rounded edges 64 exist between the vertical ribs and the base. The advantage of this design of grid is that the rounded edges are easier to clean. Also, grid 60 can be more readily coated with a non-stick coating of the type previously described. However, the die required to extrude a grid of the design shown in FIG. 12 is more expensive; and, accordingly, the cost of production is raised somewhat.

Figure 13:
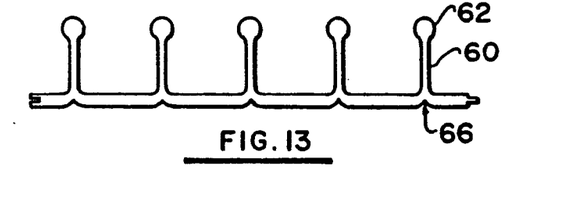
FIG. 13 is an end view similar to FIGS. 11 and 12 and depicting yet another grid element construction embodying features of the present invention.

FIG. 13 illustrates in end view yet another grid design which is quite similar to that shown in FIG. 12. However, in this instance shallow convection grooves 66 are formed in the underside thereof. These grooves 66 not only cut down on total metal content of the grid 60, but also enhance heat conductivity throughout the grid 60 and particularly throughout each rib.

Figure 14:
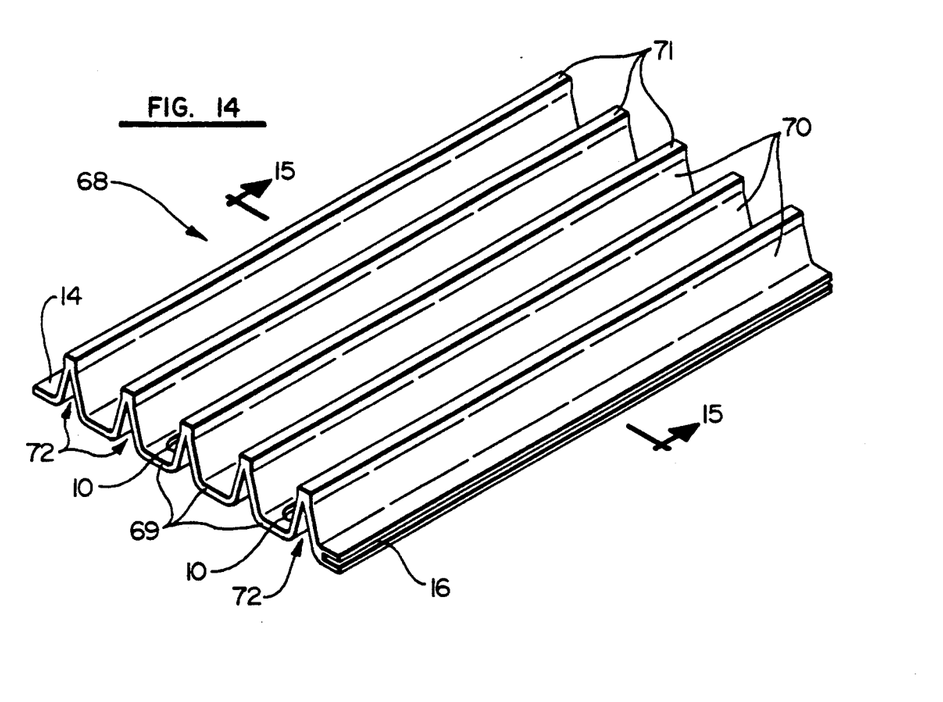
FIG. 14 is an isometric view similar to FIG. 1, but here illustrating a somewhat modified grid element embodying features of the present invention, and which is found to be particularly advantageous when formed of extruded aluminum or the like, thus facilitating cleaning thereof; and, FIG. 15 is a vertical sectional view similar to those shown in FIGS. 11, 12 and 13, but here taken substantially along the line 15—15 in FIG. 14.
Figure 15:
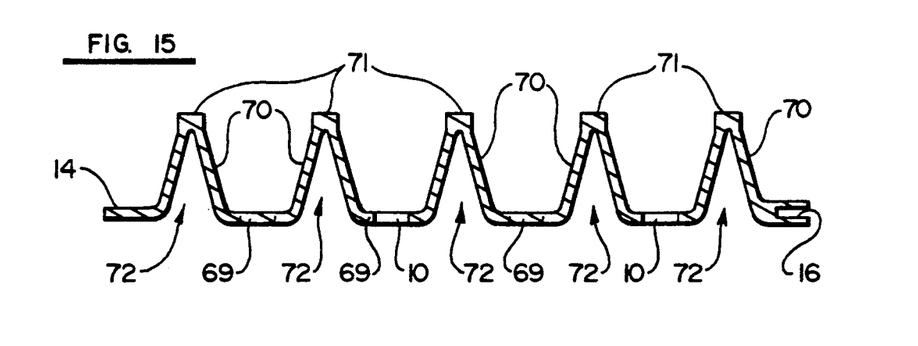

Turning now to FIGS. 14 and 15, a slightly modified grid element, generally indicated at 68, has been depicted which has been found to employ many of the advantageous features of each of the grid elements previously described. Thus, as here shown, grid element 68 comprises an aluminum extrusion having a generally planar discontinuous base member formed of a series of laterally spaced co-planar base portions 69 which are here interconnected by means of inverted V-shaped ribs 70 terminating at their upper ends in longitudinally extending, laterally spaced grill rails 71. Such an arrangement insures the formation of relatively deep convection channels, generally indicated at 72, which are disposed beneath the inverted V-shaped ribs 70, thereby insuring that hot cooking gases are permitted to circulate over substantially the entire undersurface of the grid element 68. As in the case of the grid element 2 depicted in FIGS. 1 and 2, the base portions 69 are provided with a series of staggered openings 10 which serve to permit hot combustion gases to pass upwardly through the grid element 68 and to contact the food being cooked, while at the same time permitting free expansion and/or contraction of the grid element 68 when subjected to heating and/or cooling. Additionally, the modified grid element 68 also includes a longitudinally extending tongue 14 along one longitudinal edge and a complementally shaped groove 16 along its opposite longitudinal edge so that a plurality of such grids can be assembled in side-by-side relation.

Thus, those persons skilled in the art will appreciate that there have herein been described highly efficient and cost effective grid elements for use with barbecue-type cooking apparatus whether the apparatus be of the charcoal heated type, the gas-fired type, or heated by the use of electric heating elements. In each instance, because the grid element is formed of extruded aluminum, it is not only light in weight and resistant to corrosion of all types, but, additionally, it is recyclable. The extensive metallic planar base portion—which constitutes from seventy-five percent (75%) to ninety percent (90%) of the total surface area of the grid element—serves to promote effective, uniform and efficient distribution of heat, thereby minimizing the quantity of fuel required. Indeed, it has been found that barbecue-type cooking apparatus embodying the features of the present invention operate efficiently at levels on the order of eight thousand (8,000) BTU's as contrasted with conventional barbecue units which require on the order of seventeen thousand (17,000) to eighteen thousand (18,000) BTU's. Moreover, the greater efficiency of the unit enables effective cooking while subjecting the grid elements to temperatures on the order of less than eight hundred degrees (800°)F., thereby insuring long life for the non-stick coatings applied thereto.

I claim:

1. A grid element for use with barbecue-type cooking apparatus and the like, said grid element comprising, in combination:
    a) means defining a generally planar base element constructed of a heat conducting substance;
    b) means defining at least two generally parallel spaced apart elongated ribs extending vertically from said planar base element defining means and integral therewith;
    c) at least one opening formed in said base element defining means between said means defining at least two generally parallel elongated ribs; and,
    d) said planar base element defining means being rectangular in shape and having first and second opposed longitudinal edges parallel to said elongated rib defining means wherein said first longitudinal edge is formed with a laterally directed, longitudinally extending, groove and said second longitudinal edge is formed with an oppositely directed, laterally facing, longitudinally extending tongue so as to permit a plurality of said grid elements to be assembled in side-by-side relation with the laterally directed longitudinally extending tongue on one of said grid elements being received within the laterally directed longitudinally extending groove on another adjacent one of said grid elements.

2. Barbecue-type cooking apparatus and the like comprising, in combination:
    a) an open-top shell-like housing having a bottom wall and upstanding sidewall defining means;
    b) means defining a plurality of generally horizontally disposed grid elements mounted in said shell-like housing spaced above said bottom wall, each said grid element defining means including:
        i) means defining a generally planar base element constructed of a heat conductive substance;
        ii) means defining at least two generally parallel spaced elongated ribs extending vertically from said planar base element defining means and integral therewith;
        iii) at least one opening formed in said base element defining means between said means defining said at least two generally parallel elongated ribs; and
        iv) said general planar base element defining means being rectangular in shape and having oppositely directed lateral longitudinally extending first and second edges generally parallel to said rib defining means, said first edge having a longitudinally extending, laterally directed groove formed therein and said second edge comprising a longitudinally extending laterally directed tongue whereby a plurality of said grid element defining means can be interconnected in side-by-side relation with said laterally directed tongue on one of said grid element defining means being received within said laterally projecting groove on an adjacent one of said grid element defining means and with all of said grid element defining means being mounted in a generally horizontal plane within said shell-like housing; and
    c) a heat source mounted in said shell-like housing intermediate said grid element defining means and said bottom wall.

* * * * *